United States Patent
Ito et al.

(10) Patent No.: US 6,904,766 B2
(45) Date of Patent: Jun. 14, 2005

(54) HEATER WITH TWO DIFFERENT HEAT SOURCES AND AIR CONDITIONER USING THE SAME

(75) Inventors: Koji Ito, Nagoya (JP); Tomohide Shindo, Kariya (JP); Yoshihiko Okumura, Kariya (JP); Takahiro Tokunaga, Kosai (JP); Yoshiyuki Yamauchi, Chita-gun (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/663,524

(22) Filed: Sep. 16, 2003

(65) Prior Publication Data

US 2004/0060316 A1 Apr. 1, 2004

(30) Foreign Application Priority Data

Sep. 17, 2002 (JP) ........................................ 2002-270093
Jul. 18, 2003 (JP) ........................................ 2003-276654

(51) Int. Cl.[7] .............................................. F25B 13/00
(52) U.S. Cl. ...................................... 62/324.1; 165/164
(58) Field of Search ........................... 62/323.1, 324.1; 165/164, 135, 156

(56) References Cited

U.S. PATENT DOCUMENTS 4,168,745 A * 9/1979 Lastinger ..................... 165/164
5,511,384 A * 4/1996 Likitcheva ..................... 62/59

FOREIGN PATENT DOCUMENTS

| JP | 9-263121 | 10/1997 |
| JP | 11-115466 | 4/1999 |
| JP | 2000-198347 | 7/2000 |

* cited by examiner

*Primary Examiner*—Melvin Jones
(74) *Attorney, Agent, or Firm*—Harness, Dickey & Pierce, PLC

(57) ABSTRACT

A heater for an air conditioner includes plural water tubes and plural refrigerant tubes which are arranged in parallel in an air flow direction. Therefore, the heater can heat air by using at least one of the heating sources while a pressure loss in the heater can be effectively reduced. For example, in a quick-heating mode, high-temperature refrigerant from a refrigerant cycle flows into the heater to heat the blown air, and low-temperature engine-cooling water from an engine bypasses the heater. In this case, thermal leakage from the refrigerant to the engine-cooling water is avoided.

10 Claims, 8 Drawing Sheets

HEATER WITH TWO DIFFERENT HEAT SOURCES AND AIR CONDITIONER USING THE SAME

CROSS REFERENCE TO RELATED APPLICATION

This application is based on and incorporates herein by reference Japanese Patent Application No. 2002-270093 filed on Sep. 17, 2002, and No. 2003-276654 filed on Jul. 18, 2003.

FIELD OF THE INVENTION

The present invention relates to a heater with two heat sources and an air conditioner having the heater, which are effectively used for a vehicle.

BACKGROUND OF THE INVENTION

A vehicle air conditioner described in JP-A-9-263121 includes first and second heat exchangers and a heater, which are accommodated in one air-conditioning casing. The first heat exchanger and the second heat exchanger perform heat-exchange between refrigerant circulating in a vapor compression refrigerator and air to be blown toward a passenger compartment. On the other hand, the heater heats the blown air using engine-cooling water as a heat source. However, in this vehicle air conditioner, the two heat exchangers and the heater are accommodated in the heater casing. Thus, the mounting performance of the air conditioner is deteriorated, due to its large size.

In a vehicle air conditioner described in JP-A-11-115466, a sub-condenser of a refrigerant cycle and a heater are disposed in an air-conditioning case serially in an air flow direction. The sub-condenser is for heat-exchanging between high-pressure refrigerant discharged from a compressor and air blown toward a passenger compartment. The heater heats the blown air using engine-cooling water as a heat source. However, because the sub-condenser and the heater are disposed serially in the air flow direction, pressure loss is increased while air passes through the sub-conditioner and the heater.

SUMMARY OF THE INVENTION

In view of foregoing problems, it is an object of the present invention to provide a heater for heating air using two different heat sources, which effectively reduces pressure loss. It is another object of the present invention to provide an air conditioner using the heater, which reduces its size while reducing the pressure loss in an air passage.

According to the present invention, a heater for heating air to be blown into a room using waste heat and high pressure refrigerant as heat sources includes a plurality of fluid tubes in which a fluid heated by the waste heat flows and a plurality of refrigerant tubes in which the high-pressure refrigerant flows. In the heater, the fluid tubes and the refrigerant tubes are arranged in parallel in a flow direction of air to be blown into the room. Therefore, air passing through the heater can be heated by using at least one of the heating sources, and pressure loss of air passing through the heater can be reduced.

Preferably, the fluid tubes and the refrigerant tubes are alternately arranged in a line in an arrangement direction that is approximately perpendicular to the flow direction of air. More preferably, adjacent the fluid tube and the refrigerant tube are arranged to contact each other.

The heater includes a fluid tank disposed at one longitudinal ends of the fluid tubes to communicate with the fluid tubes, and a refrigerant tank disposed at one longitudinal ends of the refrigerant tubes to communicate with the refrigerant tubes. Further, the refrigerant tank is positioned on the opposite side of the fluid tank with respect to the fluid tubes and the refrigerant tubes. In this case, the fluid tubes are provided such that a fluid flow direction changes by approximately 180° in each of the fluid tubes on the opposite end of the fluid tank, and the refrigerant tubes are provided such that a refrigerant flow direction changes by approximately 180° in each of the refrigerant tubes on the opposite end of the refrigerant tank.

When the heater is used for an air conditioner, the heater is disposed in a casing for defining an air passage through which air flows toward the room. In this case, when temperature of the fluid flowing out of a waste heat source unit is less than a predetermined temperature in a heating mode for heating air to be blown into the room, the high-pressure refrigerant is circulated in the refrigerant tubes. Because the heater has two heating functions using two different heating sources, the size of the air conditioner using the heater can be reduced. Further, even when the temperature of the fluid flowing out of the waste heat source unit is less than the predetermined temperature, air passing through the heater can be effectively heated by using the high-pressure refrigerant as the heating source.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
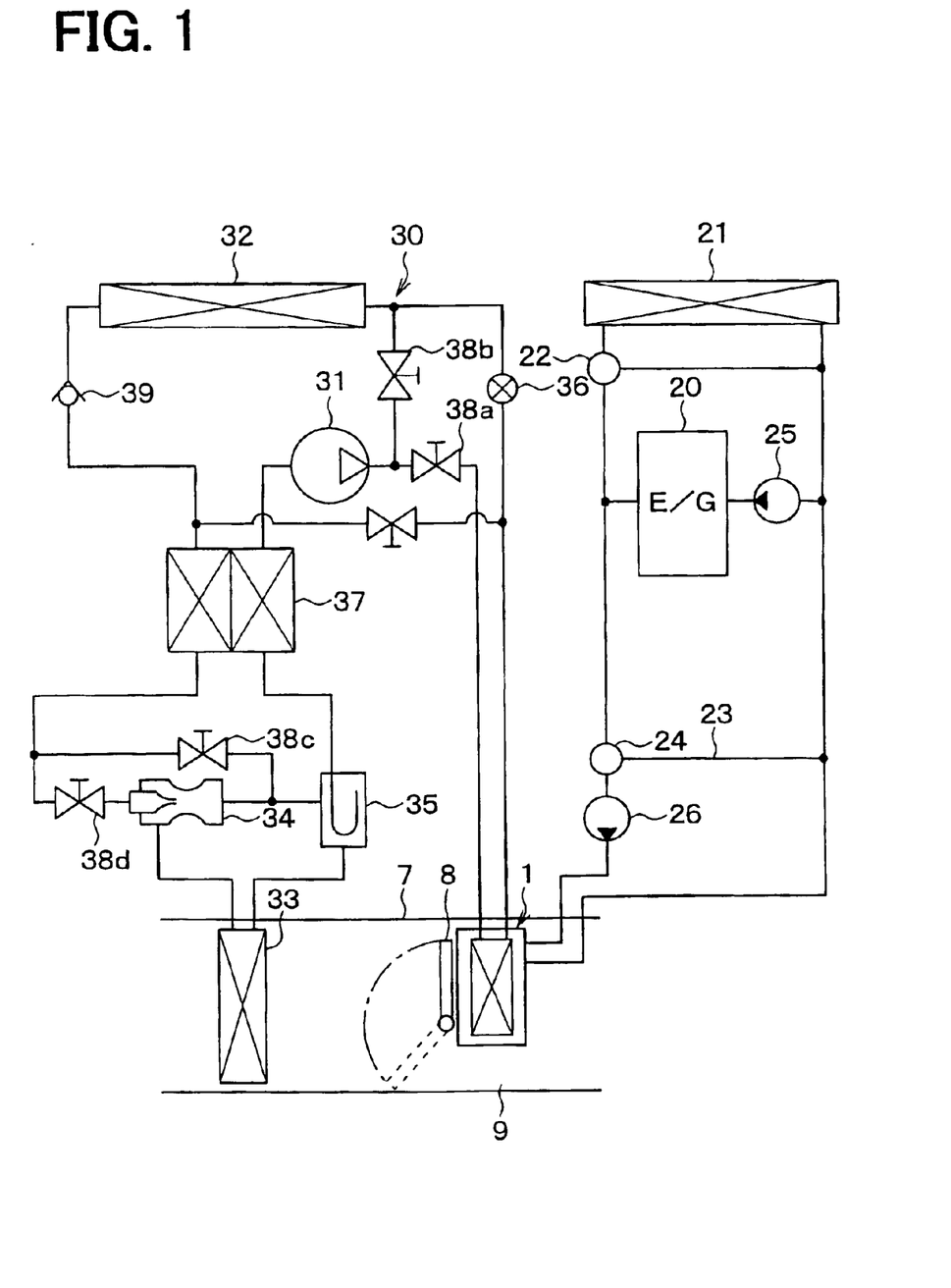
FIG. 1 is a schematic diagram showing an air conditioner according to a first embodiment of the present invention.
Figure 2:
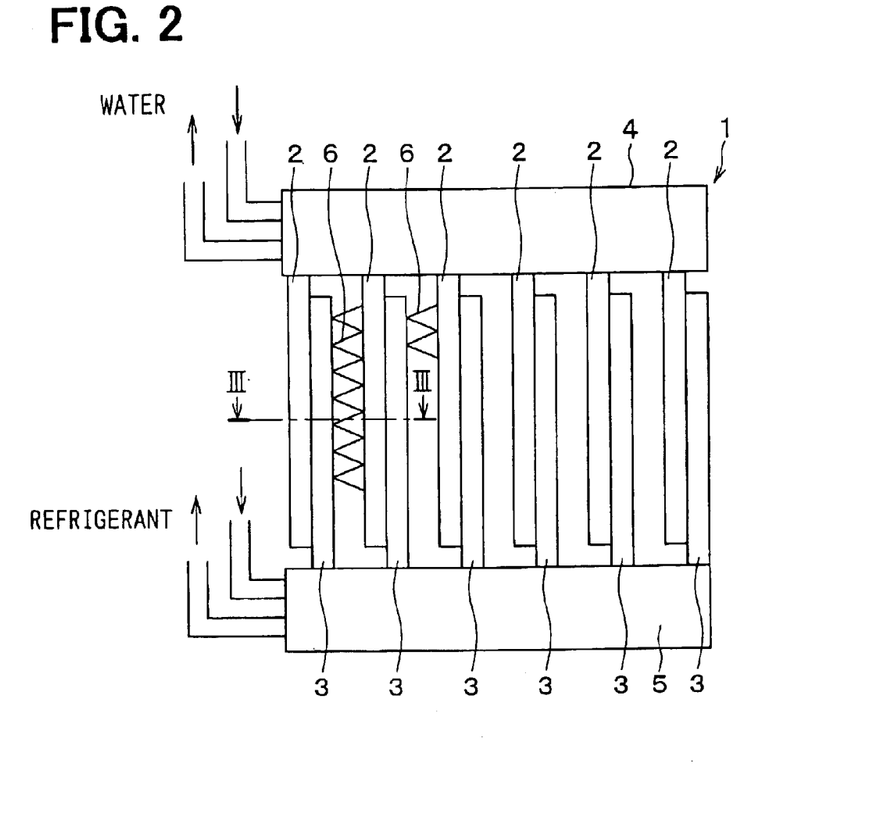
FIG. 2 is a schematic diagram showing a heater of the air conditioner according to the first embodiment.
Figure 3:
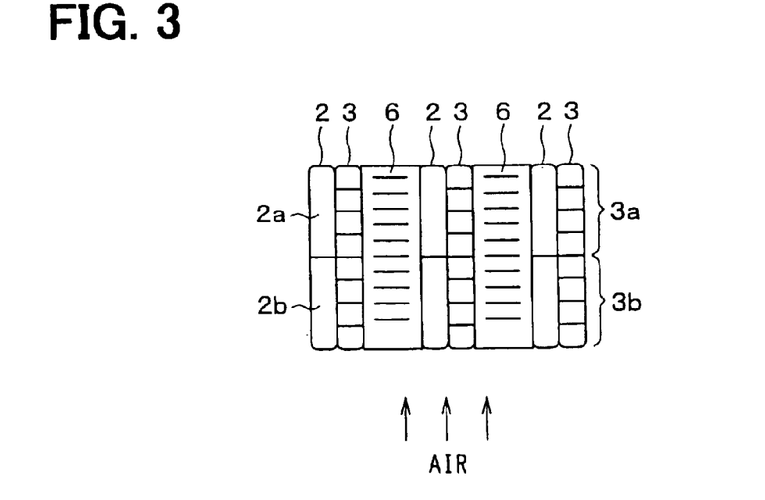
FIG. 3 is a cross-sectional view taken along the line III—III in FIG. 2, according to the first embodiment.

A heater 1 for heating air is disposed in an air conditioner as shown in FIG. 1. The heater 1 includes plural water tubes 2 and plural refrigerant tubes 3 as shown in FIG. 2 and FIG. 3. Engine-cooling water (hot water) flows in the water tubes 2 after circulating in an engine 20 (shown in FIG. 1) for recovering waste heat of the engine 20. High-pressure and high-temperature refrigerant is discharged from a compressor 31 of a vapor-compression refrigerant cycle 30 and flows into the refrigerant tubes 3. The vapor-compression refrigerant cycle 30 is a heat pump cycle for moving heat from a low temperature side to a high-pressure side. For example, the water tubes 2 and the refrigerant tubes 3 are alternatively arranged such that the longitudinal direction of the tubes 2, 3 are approximately parallel to each other.

As shown in FIG. 3, each water tube 2 is partitioned into plural passages extending in the tube longitudinal direction. In this embodiment, a first cooling water passage 2a and a second cooling water passage 2b are formed in each water tube 2, for example. The two cooling water passages 2a, 2b communicate each other on the opposite side of a water tank 4 in the tube longitudinal direction.

The water tank 4 is provided at one longitudinal end of each water tube 2 and connected each other to communicate with each of the water tubes 2. The water tank 4 is partitioned into two partition spaces extending in a tank longitudinal direction. Cooling water introduced into one partition space of the water tank 4 is distributed into the first water passages 2a of the plural water tubes 2, and changes the stream direction of the cooling water by 180° on the opposite side of the water tank 4 in the water tubes 2, and flows into the second water passages 2b of the plural water tubes 2. The cooling water after flowing through the second water passages 2b is gathered in the other partition space of the water tank 4, and flows out of the heater 1.

On the other hand, as shown in FIG. 3, each refrigerant tube 3 is partitioned into plural passages extending in the tube longitudinal direction. In this embodiment, eight passages extending in the tube longitudinal direction are formed in each refrigerant tube 3, for example. The eight passages are roughly classified into first refrigerant passages 3a and second refrigerant passages 3b. The two first and second refrigerant passages 3a, 3b communicate each other on the opposite side of a refrigerant tank 5 in the tube longitudinal direction.

As shown in FIG. 2, the refrigerant tank 5 is disposed on the opposite side of the water tank 4 with respect to the water tubes 2 and the refrigerant tubes 3, and communicates with the refrigerant tubes 3. The refrigerant tank 5 is partitioned into two partition spaces extending in the tank longitudinal direction. The two partition spaces in the refrigerant tank 5 communicate with the refrigerant passages 3a and 3b, respectively. Therefore, refrigerant introduced into a partition space of the refrigerant tank 5 is distributed into the first refrigerant passages 3a, and changes its stream direction by 180° on the opposite side of the refrigerant tank 5 in the refrigerant tube 3, and flows into the second refrigerant passages 3b. The refrigerant after flowing through the second refrigerant passages 3b is gathered in the other partition space, and flows out of the heater 1.

The water tubes 2 and the refrigerant tubes 3 are alternatively arranged in an arrangement direction (tank longitudinal direction) to form plural pairs. Each pair of the water tubes 2 and refrigerant tubes 3 is brazed, and fins 6 are brazed between the pairs for increasing heat transfer area with air. Therefore, each fin 6 is inserted between the water tube 2 and the refrigerant tube 3 of adjacent pairs in the arrangement direction. The water tubes 2, the refrigerant tubes 3 and the fins 6 are integrated and are disposed so that its layered plane is generally perpendicular to the flow direction of air passing through the heater 1.

Here, brazing and soldering are joining methods using a brazing material and a solder without melting a base metal for forming the heater 1. In a case using a melting metal which has a melting point more than 450° C., the joining method is called as brazing, and the melting metal is called as a braze. On the contrary, when the melting point of the melting metal is less than 450° C., the joining method is called as soldering, and the melting metal is called as a solder. In this embodiment, the water tubes 2, the refrigerant tubes 3 and the fins 6 are made of an aluminum alloy, and the melting metal has melting point more than 450° C.

The water tubes 2, refrigerant tubes 3 and the fins 6 are layered to form a core section. The core section of the heater 1 is exposed for heating air passing therethrough so that air to be blown into the passenger compartment is heated. Air passing through the core section is substantially perpendicular to the arrangement direction of the tubes 2, 3 and the fins 6. Therefore, the air flow direction is generally perpendicular to an air introduction surface of the core section.

Next, the vapor-compressing refrigerant cycle 30 will be now described. As shown in FIG. 1, the compressor 31 is driven by an engine 20 to suck and compress refrigerant. An exterior heat exchanger 32 performs heat-exchange between the refrigerant discharged from the compressor 31 and outside air (i.e., air outside the passenger compartment). An interior heat exchanger 33 performs heat-exchange between low-pressure refrigerant and air flowing toward the passenger compartment. The interior heat exchanger 33 is provided upstream of the heater 1 in the air flow direction in an air-conditioning casing 7 for defining an air passage through which air flows toward the passenger compartment.

An air mix door 8 is rotatably disposed for adjusting an air flow amount passing through the heater 1 and an air flow amount bypassing the heater 1 through an air-bypass passage 9. In this embodiment, the air temperature blown into the passenger compartment is controlled by adjusting an opening degree of the air mix door 8.

An ejector 34 decompresses and expands high-pressure refrigerant from the exterior heat exchanger 32 so as to suck evaporated gas refrigerant at a low-pressure side, and to raise suction pressure of refrigerant to be introduced to the compressor 31. The ejector 34 includes a nozzle, a mixing section and a diffuser. The nozzle transfers pressure energy of the high-pressure refrigerant into velocity energy so that the refrigerant is decompressed and is isentropicly expanded. The mixing section sucks gas refrigerant evaporated on a low-pressure side. The gas refrigerant is sucked into the mixing section of the ejector 34 by entrainment with a high-velocity refrigerant injected from the nozzle. The sucked gas refrigerant and the high-velocity refrigerant jetted from the nozzle are mixed in the mixing section. The diffuser further mixes the injected refrigerant and the sucked gas refrigerant. Simultaneously, the diffuser transfers its velocity energy to pressure energy, so as to increase the refrigerant pressure.

At the mixing section, driving flow of refrigerant injected from the nozzle and sucking flow of refrigerant are mixed, so that a total momentum of the driving flow and the sucking flow is conserved. Thus, refrigerant pressure increases in the mixing section.

A cross-sectional area of the refrigerant passage in the diffuser is gradually increased, so that velocity energy of the refrigerant (dynamic pressure) is transferred to pressure energy (static pressure). Refrigerant is pressurized at both mixing section and the diffuser in the ejector 34. Therefore, in the ejector 34, a pressurizing section is constructed with the mixing section and the diffuser.

Refrigerant discharged from the ejector 34 flows into an accumulator 35. The accumulator 35 is a gas-liquid separator for separating the introduced refrigerant into gas refrigerant and liquid refrigerant, and for accumulating the liquid refrigerant therein. A gas refrigerant outlet port of the accumulator 35 is connected with a suction inlet of the compressor 31, and a liquid refrigerant outlet port is connected with the interior heat exchanger 33. A J-shaped pipe is provided in the accumulator 35 for introducing the gas refrigerant in the accumulator 35 to the compressor 31. An oil recovery hole is formed in a bottom area of the J-shaped pipe, for introducing a lubrication oil to the suction inlet of the compressor 31, together with the gas refrigerant.

A decompressor 36 is an expansion valve for decompressing and expanding refrigerant isentropicly. An inner heat exchanger 37 performs heat-exchange between high-pressure refrigerant before being decompressed and low-pressure refrigerant to be sucked into the compressor 31.

Four solenoid valves 38a, 38b, 38c and 38d are provided for switching a refrigerant flow in the vapor-compression refrigerant cycle. A check valve 39 avoids a reverse flow of refrigerant from the inner heat exchanger 37 to the exterior heat exchanger 32.

A radiator 21 is provided for cooling the engine-cooling water by performing heat-exchange between the engine-cooling water and outside air. A thermostat 22 is a flow control valve for controlling the temperature of the engine 20 within a certain temperature range. The thermostat 22 controls a flow amount of engine-cooling water flowing from the engine 20 toward the radiator 21 and a flow amount of engine-cooling water flowing from the engine 20 toward a bypass-line of the radiator 21, so that the temperature of the engine 20 is controlled.

A bypass passage 23 is a bypass-line through which engine-cooling water flowing from the heater 1 returns to the heater 1 while bypassing the engine 20. A switching valve 24 is disposed to switch between a case where cooling water circulates between the engine 20 and the heater 1, and a case where cooling water circulates between the heater 1 and the bypass passage 23 while bypassing the engine 20. A pump 25 is driven by the engine 20, and a pump 26 is driven by a motor. The pumps 25, 26 are provided for circulating cooling water.

Figure 4:
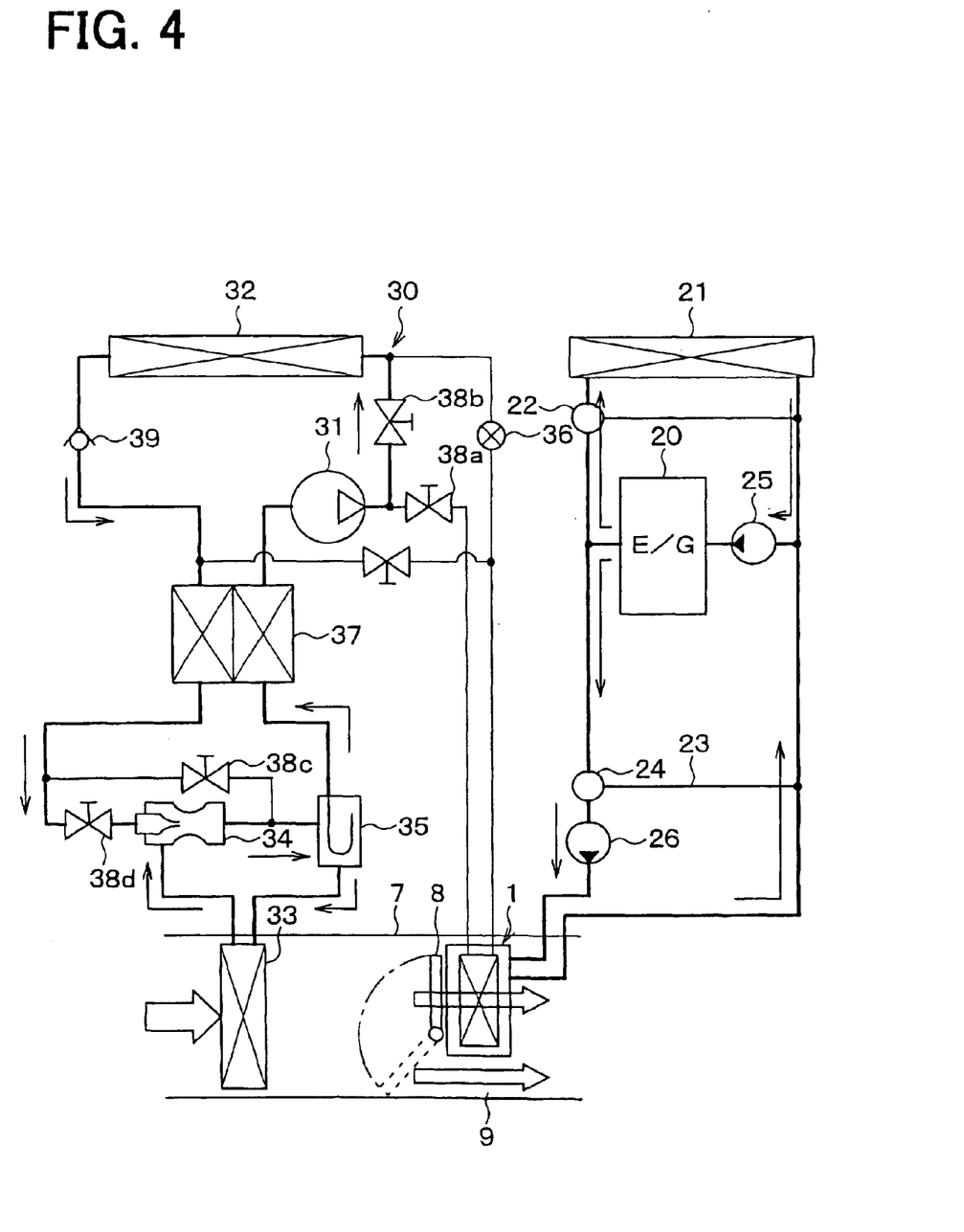
FIG. 4 is a schematic diagram showing operation of the air conditioner in a cooling mode or in a temperature control mode according to the first embodiment.

A cooling and temperature-control mode is set as shown in FIG. 4, when air blown toward the passenger compartment cannot be controlled in a desired temperature using only heated air by engine-cooling water or using only air passing the air-bypass passage 9 (not heated). In this case, cool air and warm air are mixed by using the air mix door 8 for controlling air temperature blown into the passenger compartment. This cooling and temperature-control mode is mainly set in a cooling operation for cooling the passenger compartment in summer, or in spring or in autumn. In this case, refrigerant flowing through the interior heat exchanger 33 absorbs heat from the air passing through the interior heat exchanger 33, so that the blown air is cooled and refrigerant is evaporated in the interior heat exchanger 33. Simultaneously, in the cooling and temperature-control mode, engine-cooling water is circulated between the engine 20 and heater 1 so that air is heated in the heater 1. The flow rate between cool air passing through the air-bypass passage 9 and warm air passing through the heater 1 is controlled by the air mix door 8, so that the air temperature to be blown into the passenger compartment is controlled. In maximum cooling operation, because the air passage of the heater 1 is closed, a supply of engine-cooling water to the heater 1 can be stopped.

Next, operation of the vapor-compression refrigerant cycle 30 will be now described.

Gas refrigerant is sucked into the compressor 31 from the accumulator 35, and the compressed refrigerant is discharged toward the exterior heat exchanger 32. The refrigerant is cooled in the exterior heat exchanger 32, and is decompressed and expanded in the nozzle of the ejector 34 so that refrigerant in the interior heat exchanger 33 is sucked in the ejector 34. In this embodiment, carbon dioxide is used as the refrigerant. Therefore, refrigerant pressure on the high-pressure side (i.e., discharge pressure of the compressor 31) can be set to be higher than the critical pressure of the refrigerant. In this case, temperature and enthalpy in the exterior heat exchanger 32 (i.e., high-pressure side heat exchanger) is decreased without condensing.

Refrigerant sucked from the interior heat exchanger 33 and refrigerant injected from the nozzle of the ejector 34 are mixed in the mixing section of the ejector 34, and its dynamic pressure is transferred to static pressure in the diffuser of the ejector 34. The mixed refrigerant is returned to the accumulator 35. On the other hand, refrigerant in the interior heat exchanger 33 is sucked by the ejector 34. Therefore, liquid refrigerant flows into the interior heat exchanger 33 from the accumulator 35 and the liquid refrigerant is evaporated in the interior heat exchanger 33 by absorbing heat from air to be blown into the passenger compartment. In this embodiment, air temperature immediately after passing through the interior heat exchanger 33 is set to be approximately 3° C.–4° C.

Figure 5:
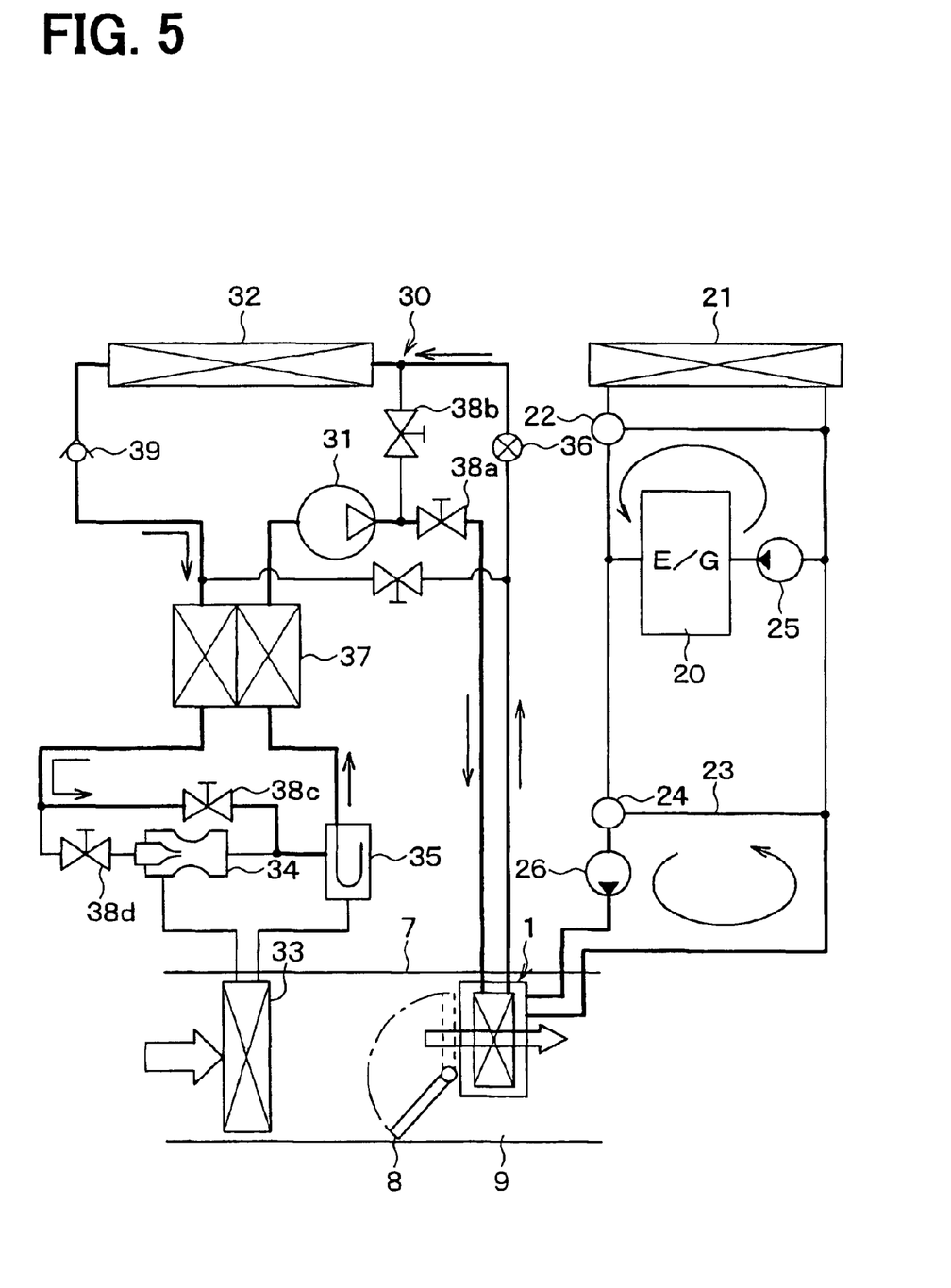
FIG. 5 is a schematic diagram showing operation of the air conditioner in a quick heating mode according to the first embodiment.

A quick heating mode shown in FIG. 5 is set when the temperature of engine-cooling water is low (e.g., below 40° C.). In a case immediately after an engine ignition, enough heating capacity can not be obtained only by the heating source of engine-cooling water. In this case, engine-cooling water is circulated between the bypass passage 23 and the heater 1. Simultaneously, high-temperature and high-pressure refrigerant from the compressor 31 is supplied to the heater 1 for heating blown air. The high-pressure refrigerant cooled in the heater 1 is decompressed in the decompressor 36, and is evaporated in the exterior heat exchanger 32 by absorbing heat from outside air. In the quick heating mode, the solenoid valve 38c is opened and the solenoid valve 38d is closed. Therefore, the evaporated refrigerant from the exterior heat exchanger 32 flows into the accumulator 35 while bypassing the ejector 34, and is sucked to the compressor 31. High-pressure side refrigerant pressure is set to be higher than the critical pressure of the refrigerant. Therefore, in the heater 1 (high-pressure side heat exchanger), the temperature of the refrigerant and enthalpy is decreased without condensing.

Figure 6:
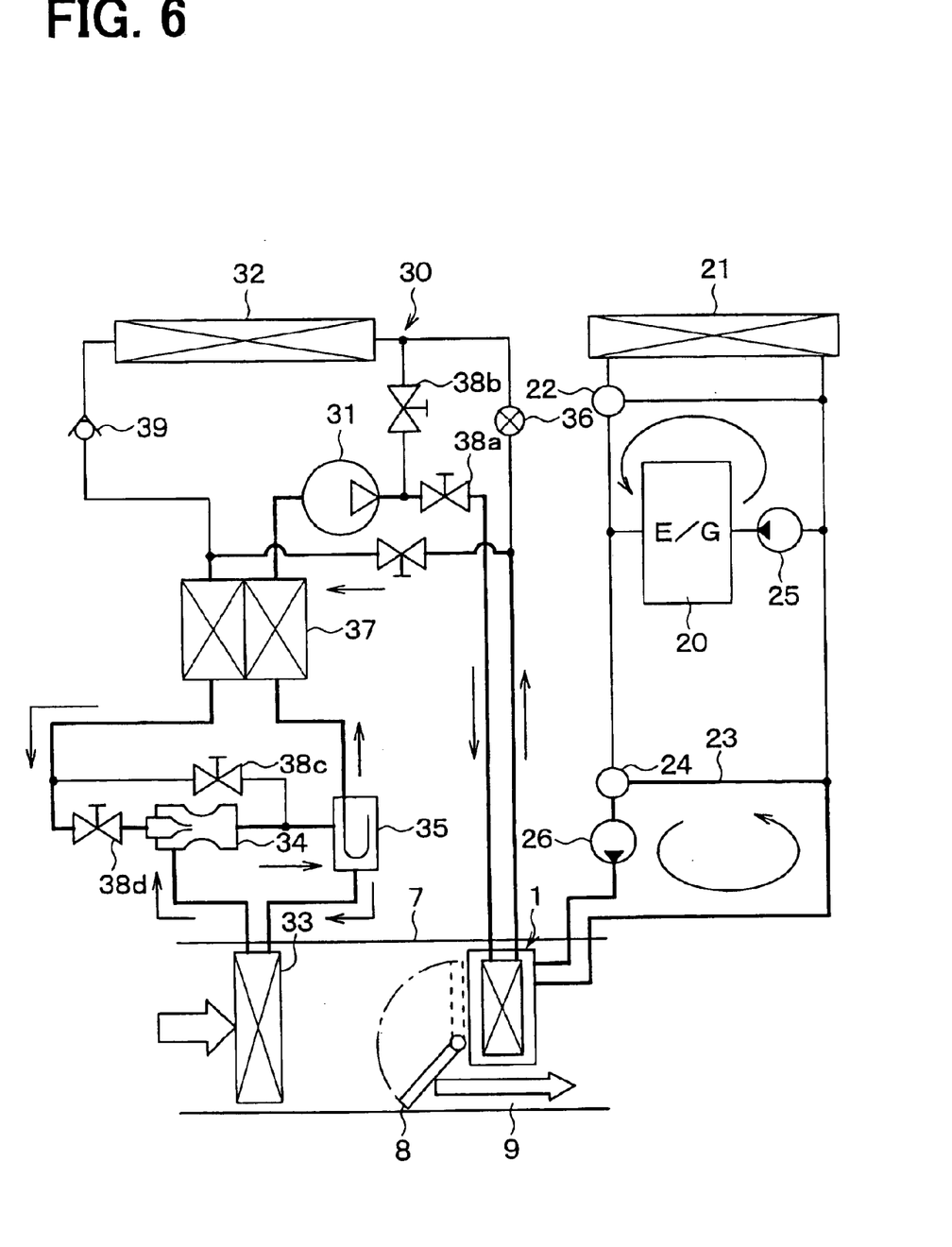
FIG. 6 is a schematic diagram showing operation of the air conditioner in a quick heating and dehumidifying mode according to the first embodiment.

A quick heating and dehumidification mode shown in FIG. 6 is set when the temperature of engine-cooling water is low (for example, below 40° C.) and dehumidification is necessary. In detail, this mode is set immediately after an engine ignition, and passenger compartment is heated and is dehumidified in the quick heating and dehumidification mode. In this case, engine-cooling water is circulated between the bypass passage 23 and the heater 1. Simultaneously, high-pressure and high-temperature refrigerant from the compressor 31 is supplied to the heater 1 so that air to be blown into the passenger compartment is heated by the high-temperature refrigerant in the heater 1. Further, refrigerant is evaporated in the interior heat exchanger 33. So that, blown air is dehumidified and is cooled in the interior heat exchanger 33.

In the quick heating and dehumidification mode, gas refrigerant is sucked from the accumulator 35, and is discharged from the compressor 31 into the heater 1. The refrigerant cooled in the heater 1 is supplied to the ejector 34, and is injected by the nozzle of the ejector 34 to be decompressed and to be expanded. Simultaneously, the ejector 34 sucks refrigerant from the interior heat exchanger 33. The sucked refrigerant and the injected refrigerant are mixed in the mixing section and its dynamic pressure is transferred to static pressure in the diffuser, and the mixed refrigerant is returned to the accumulator 35. On the other hand, because refrigerant in the interior heat exchanger 33 is sucked by the ejector 34, liquid refrigerant flows into the interior heat exchanger 33 from the accumulator 35. The liquid refrigerant absorbs heat from the air to be blown into the passenger compartment and is evaporated. In this mode, high-pressure side refrigerant pressure is set to be higher than the critical pressure of the refrigerant. Therefore, temperature and enthalpy in the heater 1 (high-pressure side heat exchanger) is decreased without condensing.

Figure 7:
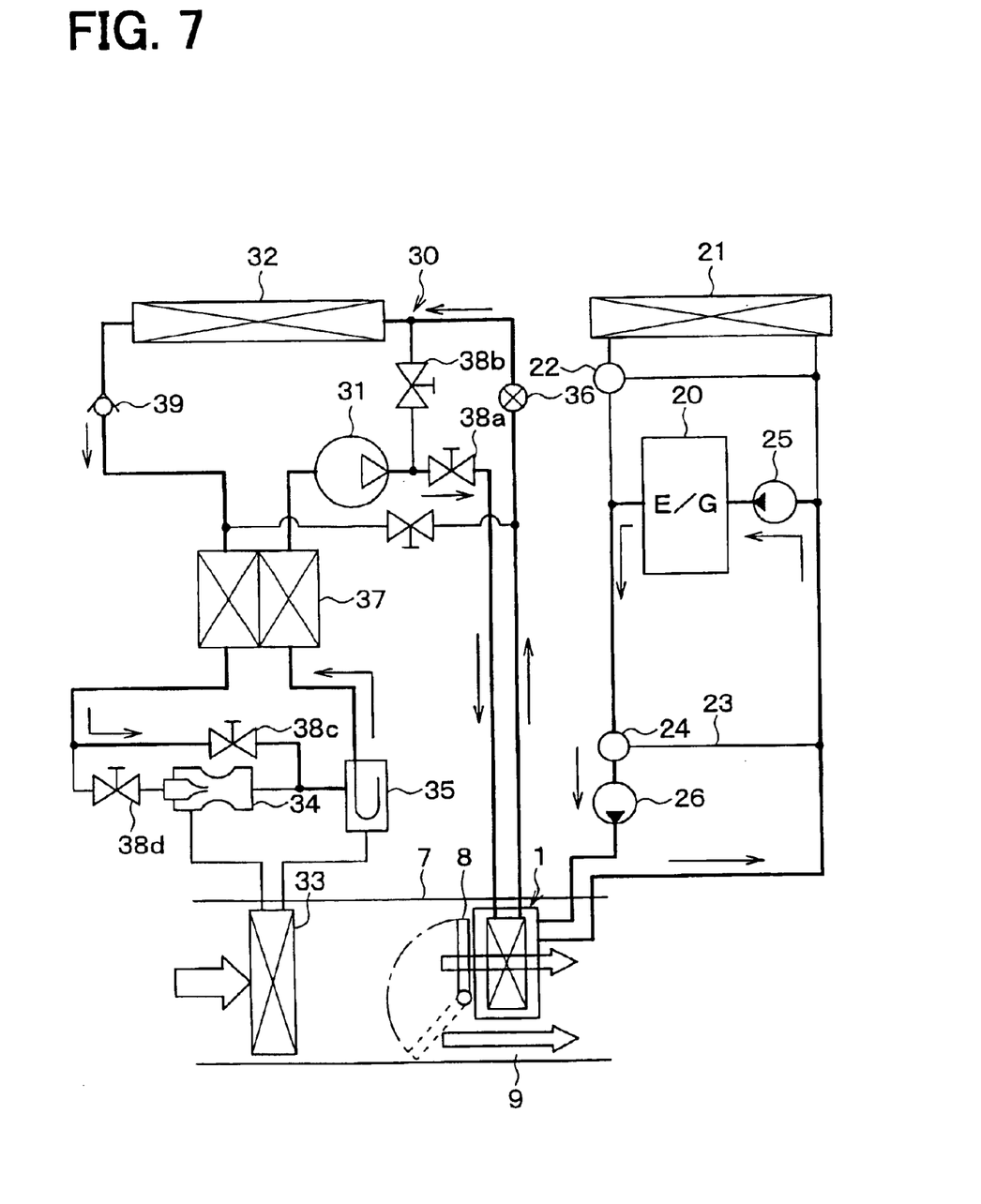
FIG. 7 is a schematic diagram showing operation of the air conditioner in a heating mode according to the first embodiment.

A heating mode shown in FIG. 7 is set when engine-cooling water temperature is sufficiently high (for example, over 40° C.) for heating air to be blown into the passenger compartment. In the heating mode shown in FIG. 7, engine-cooling water is circulated between the engine 20 and the heater 1. Simultaneously, high-pressure and high-temperature refrigerant from the compressor 31 is supplied to the heater 1 so that blown air is heated by both heating sources of the refrigerant and the engine-cooling water. Operation of the vapor-compression refrigerant cycle 30 in this heating mode is the same as that in the quick heating mode (FIG. 5). However, in the heating mode, refrigerant pressure can be set below its critical pressure when engine-cooling water temperature is sufficiently raised (for example, over 80° C.: warm-up completion temperature). Further, the compressor 31 can be stopped and the blown air can be heated using only engine-cooling water as the heating source.

In this embodiment, the water tubes 2 and the refrigerant tubes 3 are integrally formed in the heater 1. Therefore, manufacturing cost of the heater 1 can be reduced. Further, heater functions for heating air using both the heating sources of engine-cooling water and high-pressure refrigerant are integrated into one heat exchanger (i.e., heater 1). Thus, enlargement of the air conditioner is avoided, and its mounting performance is improved.

The water tubes 2 and the refrigerant tubes 3 of the core section are arranged in parallel in the air flow direction. Accordingly, it is compared with a case where two heat exchangers using different two heating sources are arranged serially (in line) in the air flow direction, the length of the heater 1 in the air flow direction is reduced, and pressure loss of air generated while passing the core section of the heater 1 is reduced.

In the quick heating mode shown in FIG. 5, engine-cooling water is circulated between the bypass passage 23 and the heater 1, so that engine-cooling water from the engine 20 is not supplied into the heater 1, and high-pressure refrigerant is circulated to the heater 1. Under this condition, heat transfer from the high-pressure refrigerant toward the engine 20 is avoided. Thus, the air to be blown into the passenger compartment can be heated quickly.

In the first embodiment described above, the refrigerant flows in the heater 1 from the inlet port toward the outlet port as decreasing its temperature. Therefore, temperature distribution on the surface of the heater 1 tends to be ununiform. As a result, air temperature blown from the heater 1 can be considered to be ununiform. However, in this embodiment, engine-cooling water is circulated in the heater 1. In this case, heat of high-temperature refrigerant on the refrigerator inlet side can be absorbed by engine-cooling water, and is transferred to low temperature refrigerant on the refrigerator outlet side. Therefore, surface temperature distribution on the heater 1 can be made uniform. Thus, air temperature blown from the heater 1 can be uniformed.

In the heating mode (refer to FIG. 7), heat of high-pressure refrigerant is transferred not only to the blown air, but also engine-cooling water in the heater 1. Therefore, the temperature of engine-cooling water can be raised quickly. Thus, heating operation by the vapor-compression refrigerant cycle 30 can be completed at an early stage, so that power consumption of the vapor-compression refrigerant cycle 30 can be decreased. Besides, total emission of hazardous substance can be reduced.

Figure 8:
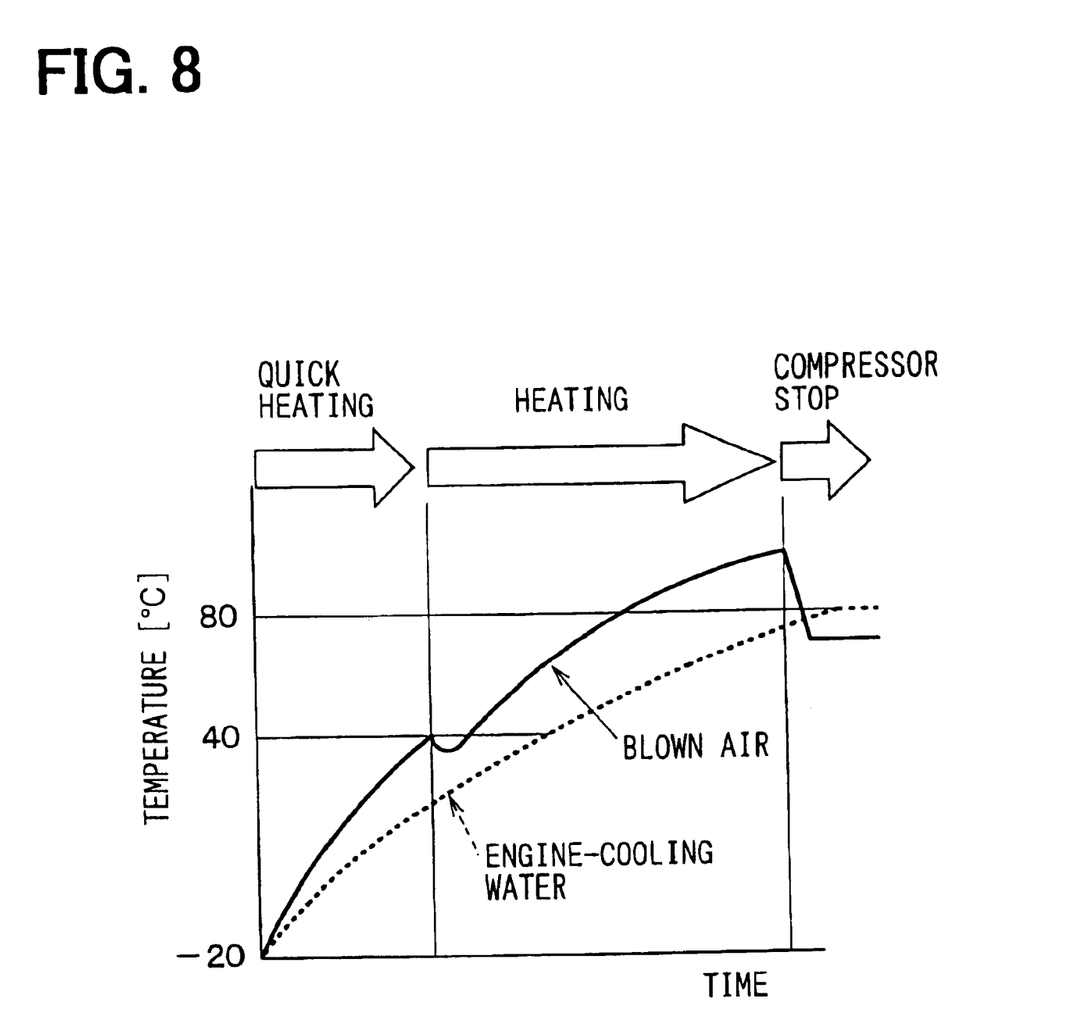
FIG. 8 is a graph showing temperature changes of engine-cooling water and blown air according to the first embodiment.

FIG. 8 shows variations in the air temperature blown from the heater 1 and the engine-cooling water temperature, in the quick heating mode and the heating mode after the vapor-compression refrigerant cycle 30 operates. As shown in FIG. 8, air temperature blown from the heater 1 can be set higher than engine-cooling water temperature immediately after heating operation start.

(Second Embodiment)

Figure 9:
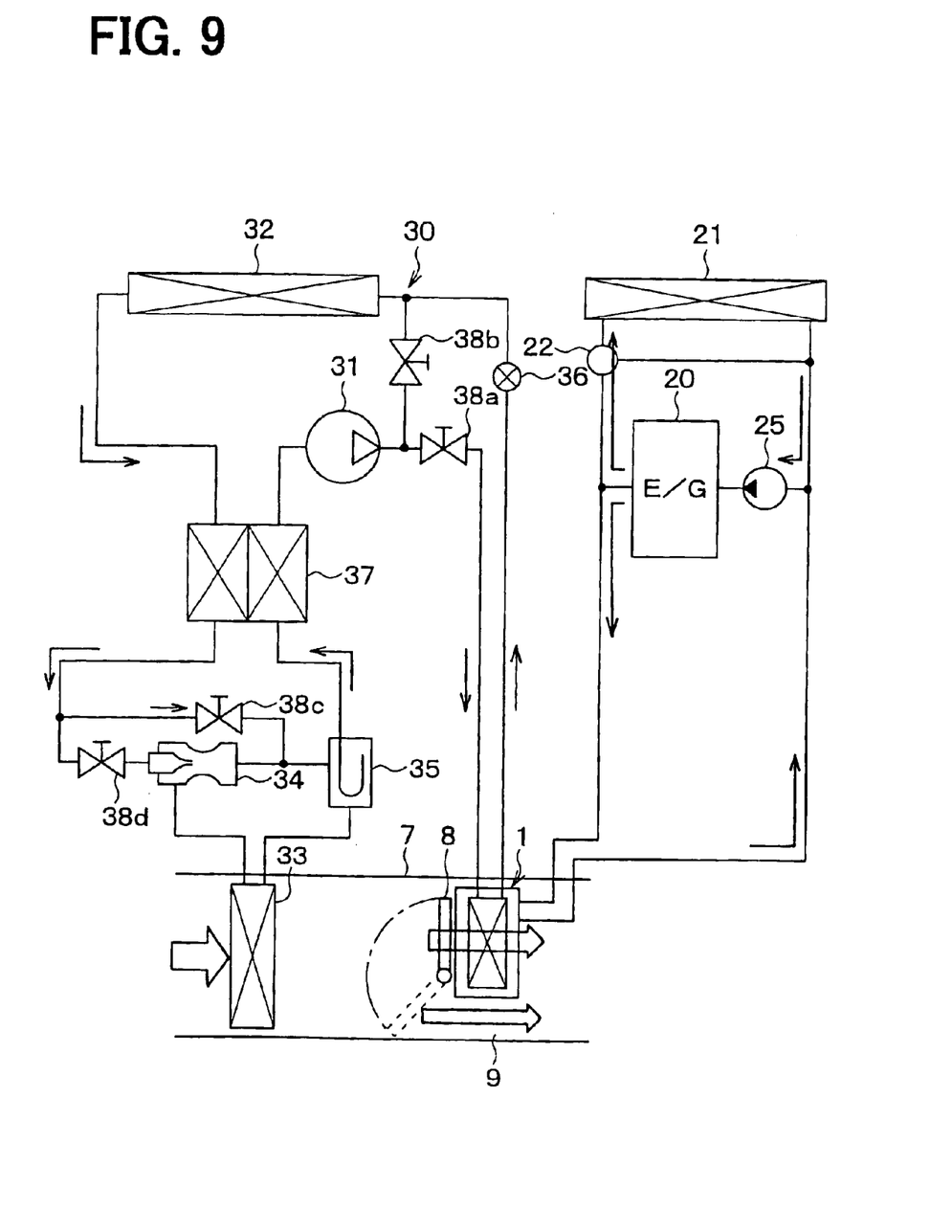
FIG. 9 is a schematic diagram showing an air conditioner according to a second embodiment of the present invention.

In the second embodiment, as shown in FIG. 9, the vapor-compression refrigerant cycle 30 has one of heating function and cooling function. That is, when the heater 1 has the heating function by using the high-temperature refrigerant discharged from the compressor 31, the interior heat exchanger 33 does not have the cooling function. On the other hand, when the interior heat exchanger 33 has the cooling function, the heater 1 does not have the heating function by using the high-temperature refrigerant. Besides, the bypass passage 23 and the switching valve 24 are reduced in the cooling water circuit of the engine 20. In the second embodiment, the other parts are similar to those of the above-described first embodiment.

(Other Embodiment)

Although the present invention has been fully described in connection with the preferred embodiments thereof with reference to the accompanying drawings, it is to be noted that various changes and modifications will become apparent to those skilled in the art.

For example, the water tubes 2 and the refrigerant tubes 3 are not necessarily vertically provided in the tube longitudinal direction, but the water tubes 2, and the refrigerant tubes 3 can be horizontally provided in the tube longitudinal direction.

In the quick heating mode and the quick heating and dehumidification mode, high-pressure refrigerant can be circulated to the refrigerant tube 3 while engine-cooling water circulation into the heater 1 is stopped.

For decompression of the refrigerant, an expansion equipment such as a turbine and an expansion valve for isenthalpicly decompressing or the like can be used instead of the ejector 34.

The invention is not limited to be applied to the air conditioner for a vehicle, and the waste heat source is not limited to the engine 20. For example, cooling water for adjusting a fuel cell system of a vehicle can be used as a heating source for heating air in the heater 1.

In the quick heating or the like, hot refrigerant is supplied to the heater 1 while heat is absorbed in the exterior heat exchanger 32 from outside air. However, hot-refrigerant can be supplied to the heater 1 while heat is absorbed in the air to be blown in the interior heat exchanger 33.

The arrangement structure of the water tubes 2, the refrigerant tubes 3 and the fins 6 is not limited to the above embodiment. For example, the fins 6 can be disposed between the water tubes 2 and the refrigerant tubes 3 without brazing each pair of the tubes 2, 3. Brazing and soldering between the water tubes 2, the refrigerant tubes 3 and the fins 6 are not necessarily performed. The refrigerant is not limited to carbon dioxide, and the pressure of the high-pressure refrigerant is not necessarily over its critical pressure. For example, freon or the like can be used as the refrigerant.

The water tubes 2 and the refrigerant tubes 3 can indirectly contact each other via highly thermal conductive material such as a copper foil or the like. Further, the shape of the fins 6 can be changed to other shapes.

The nozzle is not limited to a Laval nozzle adopted in this embodiment. The Laval nozzle has a reduced throat in its passage to increase injected refrigerant velocity up to more than sound speed. For example, a tapered nozzle or the like can be used in the ejector 34. Further, in the heater 1, the water tubes 2 and the refrigerant tubes 3 are not necessarily alternatively arranged. For example, the tubes 2 can be arranged one side of the core section of the heater 1 and the tubes 3 can be arranged the other side of the core section of the heater 1 in the arrangement direction, while the tubes 2 and the tubes 3 are arranged in parallel in the flow direction of air passing through the heater 1.

Such changes and modifications are to be understood as being within the scope of the present invention as defined by the appended claims.

What is claimed is:

1. A heater for an air conditioner using waste heat and high pressure refrigerant as heat sources for heating a room, the heater comprising:
    a plurality of fluid tubes, in which a fluid heated by the waste heat flows, exposed in air to be blown into the room; and
    a plurality of refrigerant tubes, in which the high-pressure refrigerant flows, exposed in air to be blown into the room, wherein
    the fluid tubes and the refrigerant tubes are arranged in parallel in a flow direction of air to be blown into the room such that the fluid and the high-pressure refrigerant perform heat exchange therebetween; and
    a cross-section of each of the fluid tubes and the refrigerant tubes has a rectangular shape having a long side and a thin side, the long side being disposed generally parallel to the flow direction of the air.

2. A heater for an air conditioner using waste heat and high pressure refrigerant as heat sources for heating a room, the heater comprising:
    a plurality of fluid tubes, in which a fluid heated by the waste heat flows, exposed in air to be blown into the room; and
    a plurality of refrigerant tubes, in which the high-pressure refrigerant flows, exposed in air to be blown into the room, wherein
    the fluid tubes and the refrigerant tubes are arranged in parallel in a flow direction of air to be blown into the room; and
    the fluid tubes and the refrigerant tubes are alternately arranged in a line in an arrangement direction that is approximately perpendicular to the flow direction of air.

3. A heater for an air conditioner using waste heat and high pressure refrigerant as heat sources for heating a room, the heater comprising:
    a plurality of fluid tubes, in which a fluid heated by the waste heat flows, exposed in air to be blown into the room; and
    a plurality of refrigerant tubes, in which the high-pressure refrigerant flows, exposed in air to be blown into the room;
    a fluid tank disposed at one longitudinal ends of the fluid tubes to communicate with the fluid tubes; and
    a refrigerant tank disposed at one longitudinal ends of the refrigerant tubes to communicate with the refrigerant tubes, the refrigerant tank being positioned on the opposite side of the fluid tank with respect to the fluid tubes and the refrigerant tubes, wherein:
    the fluid tubes are provided such that a fluid flow direction changes by approximately 180° in each of the fluid tubes on the opposite end of the fluid tank;
    the refrigerant tubes are provided such that a refrigerant flow direction changes by approximately 180° in each of the refrigerant tubes on the opposite end of the refrigerant tank; and
    the fluid tubes and the refrigerant tubes are arranged in parallel in a flow direction of air to be blown into the room.

4. The heater according to claim 1, further comprising a plurality of fins each of which contacts the fluid tube and the refrigerant tube adjacent to the fins.

5. A heater for an air conditioner using waste heat and high pressure refrigerant as heat sources for heating a room, the heater comprising:
    a fluid tube, in which a fluid heated by the waste heat flows, exposed in air to be blown into the room; and
    a refrigerant tube, in which the high-pressure refrigerant flows, exposed in air to be blown into the passenger compartment,
    wherein the fluid tube and the refrigerant tube are arranged in a line in an arrangement direction approximately perpendicular to in a flow direction of air to be blown into the room.

6. An air conditioner using waste heat from a waste heat source unit and high-pressure refrigerant from a refrigerant cycle as heat sources for heating a room, the air conditioner comprising:
    a casing for defining an air passage through which air flows toward the room;
    a heater disposed in the air passage for heating air, the heater including:
    a plurality of fluid tubes in which a fluid heated by the waste heat flows; and
    a plurality of refrigerant tubes in which the high-pressure refrigerant flows, wherein:
    the fluid tubes and the refrigerant tubes are arranged in a flow direction of air; and
    when temperature of the fluid flowing out of the waste heat source unit is less than a predetermined temperature in a heating mode for heating air to be blown into the room, the high-pressure refrigerant is circulated in the refrigerant tubes.

7. The air conditioner according to claim 6, wherein, when the temperature of the fluid flowing out of the waste heat source unit is less than the predetermined temperature, a flow of the fluid from the waste heat source unit to the heater is stopped.

8. The air conditioner according to claim 6, wherein, when the temperature of the fluid flowing out of the waste heat source unit is less than the predetermined temperature, the fluid is circulated in the heater while the flow of the fluid from the waste heat source unit to the heater is stopped.

9. The heater according to claim 1, wherein the long portions of the fluid tubes and the long portions of the refrigerant tubes can perform heat exchange with each other.

10. The heater according to claim 1, wherein the long portions of the fluid tubes contact the long portions of the refrigerant tubes.

* * * * *